US012564968B2

(12) United States Patent
Geng et al.

(10) Patent No.: US 12,564,968 B2
(45) Date of Patent: Mar. 3, 2026

(54) VISION-BASED TRACKING CONTROL METHOD FOR QUADRUPED ROBOT, AND QUADRUPED ROBOT SYSTEM

(71) Applicant: IXOVA INC, Dover, DE (US)

(72) Inventors: Kangming Geng, Hong Kong (HK);
Angela Yijia Geng, Los Angeles, CA (US)

(73) Assignee: IXOVA INC, Dover, DE (US)

( * ) Notice: Subject to any disclaimer, the term of this patent is extended or adjusted under 35 U.S.C. 154(b) by 0 days.

(21) Appl. No.: 19/342,661

(22) Filed: Sep. 28, 2025

(65) Prior Publication Data

US 2026/0027730 A1    Jan. 29, 2026

Related U.S. Application Data

(63) Continuation of application No. 19/283,272, filed on Jul. 29, 2025, now abandoned.

(51) Int. Cl.
B25J 9/16 (2006.01)
B25J 19/02 (2006.01)

(52) U.S. Cl.
CPC ............. B25J 9/1697 (2013.01); B25J 9/161 (2013.01); B25J 9/1666 (2013.01); B25J 19/023 (2013.01)

(58) Field of Classification Search
CPC ........ B25J 9/1697; B25J 9/161; B25J 9/1666; B25J 19/023
See application file for complete search history.

(56) References Cited

U.S. PATENT DOCUMENTS

| | | | |
|---|---|---|---|
| 2019/0271550 A1* | 9/2019 | Breed | ................ G01C 21/3811 |
| 2022/0066456 A1* | 3/2022 | Ebrahimi Afrouzi | ........................ G06F 3/04883 |
| 2023/0415342 A1* | 12/2023 | Klingensmith | ....... G01S 17/931 |
| 2025/0103052 A1* | 3/2025 | Klingensmith | ........ G05D 1/246 |
| 2025/0187202 A1* | 6/2025 | McCall | ................. B25J 9/0009 |

* cited by examiner

*Primary Examiner* — Jay Khandpur

(57) ABSTRACT

A vision-based tracking control method for a quadruped robot includes receiving unilateral images captured by multiple cameras pointing different directions and utilizes an image stitching algorithm to synthesize the unilateral images into a panoramic image; based on the panoramic image, determining first and second position coordinates of the moving target and environmental obstacles; and formulating or modifying a navigation path for tracking the moving target based on the first and second position coordinates. The method significantly improves the perception ability, navigation accuracy and robustness of the quadruped robot in dynamic environments, thereby achieving more intelligent and flexible control.

9 Claims, 3 Drawing Sheets

VISION-BASED TRACKING CONTROL METHOD FOR QUADRUPED ROBOT, AND QUADRUPED ROBOT SYSTEM

CROSS REFERENCE TO RELATED APPLICATIONS

This application is a continuation application of U.S. application Ser. No. 19/283,272, filed on Jul. 29, 2025. The contents of the above-identified application are incorporated herein by reference.

FIELD OF THE INVENTION

The present invention relates to the field of bionic mobile robotics, and more particularly to a vision-based tracking control method for a quadruped robot, and a quadruped robot system.

BACKGROUND OF THE INVENTION

As bionic mobile robots, quadruped robots have significant application potential in reconnaissance, inspection, transportation, and other fields in complex environments. To enable autonomous navigation and task execution in such environments, obtaining complete and real-time surrounding information is crucial. Therefore, technologies capable of rapidly acquiring panoramic images have become key for quadruped robot systems to perceive their environment, achieve autonomous movement, and track targets.

Currently, LiDAR is commonly used to detect the surrounding environment, gather information, and formulate navigation paths. However, this method is costly, susceptible to electromagnetic interference, and hinders the widespread adoption of the quadruped robots.

As a non-contact tracking solution, vision-based tracking and navigation systems offer advantages such as relatively low cost and resistance to electromagnetic interference. Thus, replacing LiDAR with vision-based tracking and navigation systems is a viable option. However, traditional monocular or binocular cameras have limited fields of view, thus it's difficult to meet the demand for panoramic information in dynamic and complex environments.

Alternatively, solutions that use a single rotating camera to capture the panoramic images require multiple shots and stitching, resulting in slow panoramic image generation and failing to meet the high-speed requirements for real-time target tracking by quadruped robots.

SUMMARY OF THE INVENTION

The objective of the present invention is to provide a vision-based tracking control method for a quadruped robot and a quadruped robot system that can meet the need for rapid environmental detection during movement.

To achieve the above objective, the present invention provides a vision-based tracking control method for a quadruped robot. The method includes:

configuring a panoramic camera on a quadruped robot, wherein the panoramic camera includes at least three cameras arranged in a non-coplanar array, with optical axes of the cameras oriented in different directions such that the cameras collectively cover a 360-degree horizontal range; and images captured by adjacent cameras have overlapping regions at edges of fields of view;

receiving in real time unilateral images captured by each of the cameras at a same moment, and stitching the unilateral images based on an image stitching algorithm to synthesize a panoramic image corresponding to a current moment;

generating first position coordinates of a moving target and second position coordinates of an obstacle in a current environment based on the panoramic image;

formulating or modifying a navigation path for tracking the moving target based on the first position coordinates and the second position coordinates; and controlling the quadruped robot to move along the navigation path.

As a preferable embodiment, the optical axes of the adjacent cameras form equal angles with each other.

As a preferable embodiment, the images captured by the adjacent cameras have overlapping regions of 12%-14% at the edges of fields of view.

As a preferable embodiment, said stitching the unilateral images includes performing dynamic weighted fusion processing on the overlapping regions affected by motion blur based on a nonlinear optimization algorithm of ORB (Oriented FAST and Rotated BRIEF) feature point matching.

As a preferable embodiment, the navigation path is formulated by establishing a path cost function incorporating dynamic weighting factors, with the weighting factors including a moving target distance coefficient, an obstacle density coefficient, and a terrain complexity; and performing global path planning by the path cost function and performing a local trajectory correction by a dynamic window approach.

As a preferable embodiment, when the moving target is detected as lost, the method executes activating a particle filter-based predictive tracking mode to predict potential regions where the moving target may appear based on historical motion trajectories; and simultaneously controlling the quadruped robot to spirally expand a search path until the moving target is recaptured.

As a preferable embodiment, the quadruped robot is further equipped with a light sensor and a light-assisted processing system. When the light sensor detects that a current ambient brightness is below a first preset value, the light-assisted processing system is activated to provide supplementary light. When the light sensor detects that the current ambient brightness exceeds a second preset value, the light-assisted processing system activates a light filter device to cover the cameras.

The present invention further provides a quadruped robot system including a panoramic camera and a controller configured on a quadruped robot. The panoramic camera includes at least three cameras arranged in a non-coplanar array, with optical axes of the cameras oriented in different directions such that the cameras collectively cover a 360-degree horizontal range. Images captured by adjacent cameras have overlapping regions at edges of fields of view, and the controller is configured to control the quadruped robot to move according to the method mentioned above.

The present invention further provides quadruped robot system, including one or more processors; a memory; and one or more programs stored in the memory and configured to be executed by the one or more processors. The one or more programs include instructions for executing the method mentioned above.

The present invention further provides a computer-readable storage medium, including a computer program executable by a processor to implement the method mentioned above.

Compared to existing technologies, the control method according to the present invention enables the quadruped robot to receive unilateral images captured by multiple cameras pointing different directions and utilizes an image stitching algorithm to synthesize the unilateral images into a panoramic image. Based on the panoramic image, the method can accurately determine the position coordinates of the moving targets and environmental obstacles. Subsequently, an optimized navigation path is generated, and the quadruped robot is controlled to move along this path. The entire method involves close collaboration among panoramic visual perception, image processing, moving target localization, environment perception, path planning, and motion control, by which the quadruped robot achieves autonomous navigation and moving target tracking in complex environments. By using the data from multiple cameras and integrating image processing and path planning algorithms, the present method effectively overcomes the limitations of traditional monocular or binocular vision systems in terms of field-of-view coverage and environment perception, and significantly enhances the quadruped robot's sensing capability, navigation accuracy, and robustness in dynamic environments, thereby realizing more intelligent and flexible quadruped robot control.

BRIEF DESCRIPTION OF THE DRAWINGS

The accompanying drawings facilitate an understanding of the various embodiments of this invention. In such drawings.

DETAILED DESCRIPTION OF ILLUSTRATED EMBODIMENTS

To elaborate on the technical content, structural features, objectives, and effects of the present invention, the following detailed explanation is provided in conjunction with the implementation methods and accompanying drawings.

The embodiments of the present invention disclose a vision-based tracking control method for a quadruped robot to dynamically track a moving target. The quadruped robot, also called as a robotic dog, is a mobile platform with bionic characteristics, which can replace humans in inspecting areas where moving targets are present.

Figure 1:
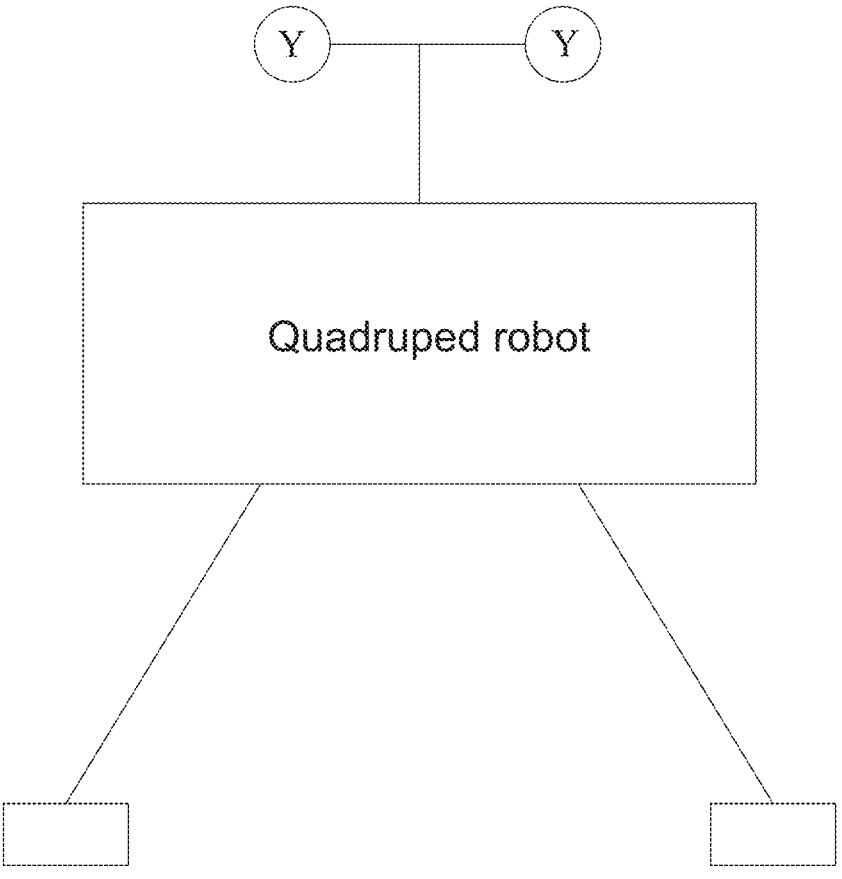
FIG. 1 is a schematic structural diagram of the quadruped robot according to an embodiment of the present invention.
Figure 2:
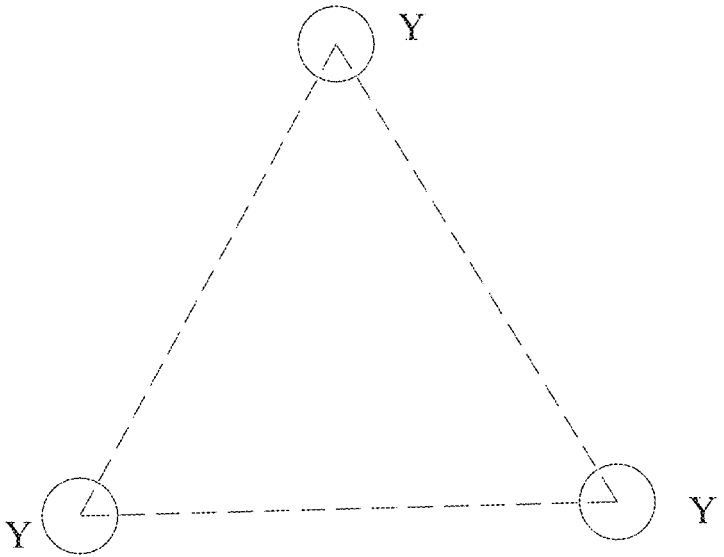
FIG. 2 shows the planar structural arrangement of cameras in one embodiment of the present invention.
Figure 3:
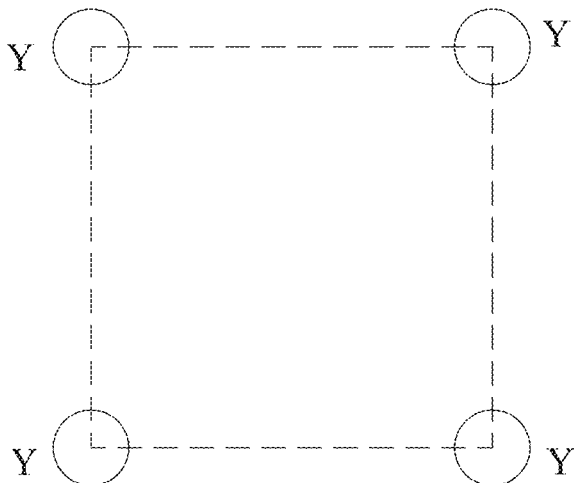
FIG. 3 shows the planar structural arrangement of cameras in another embodiment of the present invention.

As shown in FIGS. 1 to 3, a panoramic camera is configured on the quadruped robot. The panoramic camera includes at least three cameras Y, which are arranged in a non-coplanar array. The optical axes of the cameras Y are oriented in different directions to cover a 360-degree horizontal range. Moreover, images captured by the adjacent cameras Y have overlapping regions at edges of fields of view.

Figure 4:
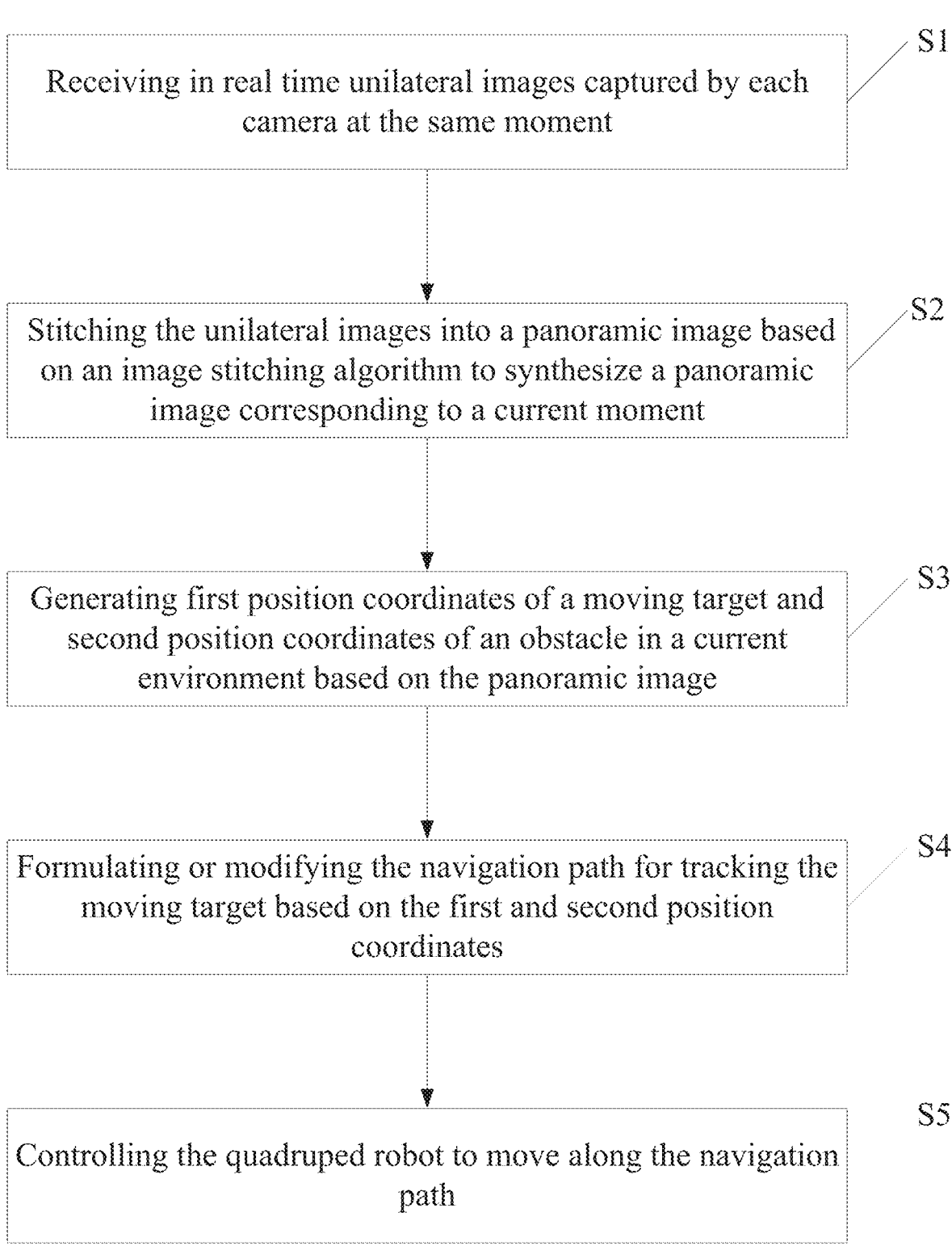
FIG. 4 is a flowchart of the control method for a quadruped robot according to an embodiment of the present invention.

Referring to FIGS. 1 and 4, the control method includes the following steps:

S1, Receiving in real time unilateral images captured by each camera at the same moment.

S2, Stitching the unilateral images into a panoramic image based on an image stitching algorithm to synthesize a panoramic image corresponding to a current moment.

S3, Generating first position coordinates of a moving target and second position coordinates of an obstacle in a current environment based on the panoramic image.

It should be noted that the first position coordinates indicate the target position for the quadruped robot's movement, while the second position coordinates indicate the avoidance targets during the quadruped robot's movement.

S4, Formulating or modifying the navigation path for tracking the moving target based on the first and second position coordinates.

S5, Controlling the quadruped robot to move along the navigation path.

The panoramic camera with multiple cameras Y in the present invention can achieve real-time panoramic perception of the environment, and image processing and navigation algorithms are combined to enhance capabilities of autonomous navigation and moving target tracking for the quadruped robot in complex dynamic environments.

Specifically, the multiple cameras Y are arranged in a non-coplanar array, that is, their optical axes are not located in the same plane. This configuration helps to better cover three-dimensional space. The fields of view of at least three cameras Y overlap to form a 360-degree combined field of view without blind spots.

The unilateral images captured simultaneously are input into the image stitching algorithm. Based on the image stitching algorithm, overlapping regions between adjacent images are firstly identified, then matching feature points in these areas are found, and relative transformation relationships between the images are calculated. Then, based on these transformation relationships, the unilateral images are projected and merged into a single panoramic coordinate system to generate a continuous panoramic image.

Particularly, considering that the movement of the quadruped robot may cause motion blur in the images, dynamic weighted fusion processing is applied to the overlapping regions with motion blur during the image stitching. That is, during the stitching of overlapping regions, the fusion weights are dynamically adjusted according to the degree of motion blur in the local image regions, so as to reduce the impact of blurred areas on the stitching results, thereby improving the clarity and accuracy of the panoramic image, especially when the quadruped robot is in motion.

The generated panoramic image contains rich information about the environment surrounding the quadruped robot, which can be used for subsequent environmental perception tasks, such as identifying and locating the moving target and the obstacles in the environment. Based on the perception results, a navigation path that avoids the obstacles and effectively tracks the moving target can be planned. The quadruped robot is then controlled to move along this path to achieve autonomous navigation and moving target tracking.

Additionally, the number of the cameras Y of the panoramic camera can be adjusted according to actual needs, such as using 3, 4, 5, or more. As known, the degree of field-of-view overlap, image resolution, and stitching computation are depended on the number of cameras. The non-coplanar array layout of the cameras can also be various. For example, the cameras Y can be distributed in a ring on the top of the quadruped robot, with some cameras slightly tilted upward or downward to cover a broader three-dimensional space. The type of cameras Y can also be chosen with different projection models, such as equidistant projection or stereographic projection, which affects the image distortion characteristics and the design of the stitching algorithm.

The image stitching algorithm can use methods based on feature point matching, direct methods based on pixel brightness or gradient information for alignment, or end-to-end panoramic image generation using deep learning approaches.

The dynamic weighted fusion processing can employ various strategies, such as estimating the degree of blur based on the gradient, texture clarity, or motion vectors of local image regions and designing corresponding weighting functions.

The algorithms for determining the position coordinates of the moving target and environmental obstacles can use traditional image processing methods, such as moving target detection, feature tracking, SLAM (Simultaneous Localization and Mapping), or deep learning-based moving target detection and segmentation models.

Navigation path generation can employ various path planning algorithms, including grid-based methods (such as the Dijkstra algorithm), sampling-based methods (such as RRT or PRM algorithms), and can be combined with local obstacle avoidance algorithms (such as VFH or APF) for real-time path correction.

Compared to the traditional monocular or binocular camera solutions, the control method of the present invention can significantly expand the perception range, eliminate blind spots in the field of view, and enhance the quadruped robot's perception of the surrounding environment. By capturing the unilateral images from each camera Y simultaneously and stitching them together, the method can avoid the time required for a single camera to mechanically rotate and scan, thereby greatly improving the speed of panoramic image generation, and achieving the quadruped robot's real-time navigation and moving target tracking in dynamic environments.

Furthermore, based on the image stitching algorithm, the dynamic weighted fusion processing is applied to the overlapping regions with motion blur, which effectively suppresses the impact of the quadruped robot's movement on image stitching quality and improves the clarity and accuracy of the panoramic images, thereby enhancing the precision of moving target localization and obstacle recognition based on the panoramic images, and providing reliable perception data for subsequent navigation and control. For example, when the quadruped robot moves at a speed of 0.5 meters per second, due to the dynamic weighted fusion processing, the average structural similarity index (SSIM) of the panoramic image is increased by more than 10%, and the moving target localization error is reduced to within 5 centimeters.

Moreover, the navigation path generated based on the accurate position coordinates of the moving target and the position coordinates of the environmental obstacles is more rational and safer. It can effectively guide the quadruped robot to avoid the obstacles and efficiently approach or follow the moving target.

Compared to expensive LiDAR systems, this vision-based perception and control scheme has lower hardware costs, which helps to reduce the overall cost of the quadruped robot and promotes its widespread application. Additionally, the vision system is less susceptible to electromagnetic interference and exhibits better robustness in complex electromagnetic environments.

Preferably, dynamic weighted fusion processing is performed on the overlapping regions affected by motion blur based on a nonlinear optimization algorithm of ORB (Oriented FAST and Rotated BRIEF) feature point matching, which can improve the stitching efficiency, accuracy, and robustness, especially in cases of image blur caused by the quadruped robot's movement. The ORB is an efficient feature detection and description algorithm. Compared to algorithms like SIFT or SURF, the ORB has the advantages of fast computation speed and robustness to rotation, making it suitable for real-time image processing on mobile platforms with limited computational resources, such as the quadruped robot. Based on the ORB feature point matching, the algorithm can quickly find a large number of corresponding feature point pairs in the overlapping regions of the unilateral images captured by adjacent cameras Y. Then, based on the matched feature point pairs, a precise transformation model between the images can be calculated through the nonlinear optimization algorithm (such as a homography matrix or more complex camera projection model parameters).

By the nonlinear optimization method, the re-projection error of all matched point pairs can be minimized, thereby resulting in more accurate image alignment than the linear method and reducing the stitching seams and ghosting effects. After a precise transformation model is calculated, the unilateral images are projected onto the panoramic plane and fused in the overlapping regions. At this point, considering the motion blur caused by the movement of the quadruped robot, the dynamic weighted fusion processing is performed based on the algorithms. This means that during the fusion process, the clarity or degree of motion blur of different positions in the overlapping regions will be assessed by the algorithm and the fusion weights of the pixels will be dynamically adjusted based on the assessment results. For example, higher weights are allocated to clearer areas, while lower weights are allocated to more blurred areas. The allocation of the weights may be further guided by the combination of the results of motion estimation, thereby retaining more details and suppressing blur artifacts in the fused panoramic images.

Preferably, the optical axes of the adjacent cameras Y form equal angles with each other.

In such a way, the configuration and installation process of the camera Y array are simplified. The cameras Y are arranged in a circular or polygonal array, with equal angles between the optical axes of adjacent cameras, thus the coverage angle of each camera is approximately equal to facilitate uniform 360-degree coverage. For example, if four cameras Y are arranged in a square array (as shown in FIG. 3) with their optical axes pointing outward horizontally, the angle between the optical axes of adjacent cameras can be set to 90 degrees. If three cameras Y are arranged in an equilateral triangular array (as shown in FIG. 2), the angle between the optical axes of adjacent cameras can be set to 120 degrees.

This configuration is beneficial to the implementation of the subsequent image calibration and stitching algorithms because the angular range occupied by each unilateral image in the panoramic image is known, and the transformation relationships between the images follow certain regularities. Therefore the complexity of geometric calculations and calibration workload are reduced. Furthermore, the geometric regularity also makes the prediction and management of image overlapping regions easier, which is beneficial for optimizing the efficiency and quality of image stitching. Therefore, the equal angles between the optical axes of the adjacent cameras Y not only simplifies the hardware structure but also facilitates the implementation of software algorithms, thereby improving the efficiency and robustness of the overall system.

Preferably, the images captured by the adjacent cameras have overlapping regions of 12%-14% at the edges of fields of view.

The overlapping regions are crucial for the image stitching algorithm to connect the images from different perspectives. Sufficient overlap provides abundant feature points or pixel information to accurately calculate the relative transformation relationships between the images, enabling high-quality seamless stitching. If the overlap is too small, there may not be enough feature points to align the images accurately, potentially leading to stitching failure. However, excessive overlap means capturing a large amount of redundant information, increasing the burden of data transmission and processing, reducing system real-time performance, and possibly introducing more cumulative errors that affect the overall consistency of the panoramic image. The 12-14% overlap range strikes a good balance between ensuring stitching accuracy and robustness, and controlling computation and hardware costs. Within this range, there are usually enough feature points or pixel correspondences to achieve precise image alignment and fusion while avoiding unnecessary redundant calculations. This range also takes into account the distortion characteristics of the cameras Y and the minor displacements or rotations that the quadruped robot may experience during movement, providing sufficient margin for the stitching algorithm.

As an embodiment, the method for formulating the navigation path includes establishing a path cost function that includes dynamic weighting factors. The weighting factors include a distance coefficient of moving target, a density coefficient of obstacle, and a complexity coefficient of terrain. The navigation path is planned globally using the path cost function and corrected locally using the dynamic window approach (DWA).

It's seen that, the formulation of the navigation path in this embodiment combines the advantages of global planning and local correction, enabling the quadruped robot to efficiently and safely track the moving target in complex environments.

The path cost function is a mathematical model that evaluates the quality of potential paths, with its output value representing the "cost" of moving along that path. The embodiment of the present invention introduces the dynamic weighting factors that adjust in real time according to the current environmental state and mission requirements, allowing the path planning to adapt to different situations.

Specifically, the weighting factors include the distance coefficient of moving target, which reflects the proximity of the path to the moving target's position (with closer paths being preferred); the density coefficient of obstacle, which reflects the density of the obstacle surrounding the path (with paths avoiding high-density obstacle areas being preferred); and the complexity coefficient of terrain, which reflects the difficulty of the terrain traversed by the path (such as slope and ground material, with easier-to-traverse areas being preferred).

These weighting factors are dynamic. For example, during moving target tracking, the weight of the moving target distance coefficient may be higher; when traversing complex obstacle areas, the weight of the obstacle density coefficient may be increased; and in rugged terrain, the weight of the terrain complexity coefficient will be increased.

By adjusting the dynamic weights, the method can flexibly balance the tracking efficiency, obstacle avoidance safety, and traversability. In the global path planning algorithm, the path cost function with the dynamic weights is used to calculate the globally optimal path from the current position to the position of the moving target on the environment map perceived by the quadruped robot (generated based on the obstacle information from the panoramic image). Global path planning provides the overall direction but may not be detailed enough to handle sudden local obstacles or the quadruped robot's own kinematic constraints. Therefore, the present method combines the dynamic window approach (DWA) for local trajectory correction.

DWA refers to a velocity-space-based local path planning method. In each control cycle, which predicts a set of possible end states the quadruped robot can reach in a short time based on its current linear and angular velocities, forming a "dynamic window"; then samples multiple velocity combinations within the dynamic window and evaluates the predicted trajectories corresponding to each velocity combination. The evaluation criteria typically include whether the trajectory will collide with an obstacle, how close it is to the moving target, whether it complies with the quadruped robot's kinematic constraints, and whether it is consistent with the global path direction. The DWA selects the optimal velocity combination and controls the quadruped robot to move at that velocity for a short period before repeating the process.

In the present invention, the local trajectory correction is performed based on the DWA, which allows the quadruped robot to avoid the local obstacles in real time, smoothly follow the global path, thereby enhancing the navigation real-time performance and safety for the quadruped robot.

Specifically, the first position coordinates of the moving target and the second position coordinates of environmental obstacles, determined based on the panoramic image, are received. These position coordinates are input into the computer-executable instructions stored in the memory and executed by the processor to run the path planning algorithm. By the path planning algorithm, a path cost function including the dynamic weighting factors is firstly established. For example, the path cost function C(path) can be expressed as C(path)=w_target×Cost_target(path)+w_obstacle×Cost_obstacle(path)+w_terrain×Cost_terrain(path), where Cost_target, Cost_obstacle, Cost_terrain are the cost terms related to the moving target distance, obstacle density, and terrain complexity, respectively, and w_target, w_obstacle, w_terrain are the corresponding dynamic weighting factors.

The weighting factors can be dynamically adjusted according to the current state of the quadruped robot (such as battery level and speed), mission priorities (such as rapid tracking or safe obstacle avoidance), and environmental perception results (such as the density of obstacles ahead). For example, when a high density of obstacles is detected ahead, the value of w_obstacle can be increased to give higher priority to obstacle avoidance in path planning. The global path planning algorithm, such as the Dijkstra algorithm, uses the dynamic cost function to search for the lowest-cost path from the current position to the position of the moving target on the constructed environment map. The environment map is built based on the second position coordinates of obstacles, which can be a two-dimensional grid map or a three-dimensional point cloud map. The result of the global path planning is a series of path points or a trajectory.

In the local trajectory correction phase, the DWA is adopted. In each control cycle, the current speed and angular velocity range of the quadruped robot (i.e., the dynamic window) is calculated. This range is constrained by the quadruped robot's maximum speed, maximum acceleration, and motor limitations, among other kinematic constraints. Within the dynamic window, a series of combinations of feasible linear and angular velocity are sampled. For each sampled velocity combination, the position and orientation of the quadruped robot after a short time step (e.g., 0.1 second) are predicted, and the quality of the predicted trajectory is evaluated. The evaluation function can take into account factors such as the proximity of the trajectory to the moving target, the distance from obstacles, the deviation from the global path, and the smoothness of the quadruped robot's movement. The velocity combination with the highest evaluation score is selected, and the corresponding control commands are output to the motion control system of the quadruped robot to control it to move under this velocity. This local planning process is repeatedly executed at a high frequency (e.g., 50 Hz), enabling the quadruped robot to respond to environmental changes in real time and smoothly follow the global path.

In the navigation path planning method of the embodiment, first, the global path planning, based on comprehensive environmental information and a dynamically adjusted cost function, can calculate the macroscopically optimal path. It can also flexibly adjust the planning strategy according to mission requirements and environmental changes, thereby enhancing the intelligence level of navigation. For example, in open areas, priority is given to quickly approaching the moving target, while in narrow areas, priority is given to safe obstacle avoidance.

Second, the local trajectory correction is performed based on the DWA, thus the quadruped robot can respond in real time to the local obstacles and performs smooth obstacle-avoidance operations while considering its own kinematic characteristics. This improves the real-time performance, safety, and feasibility of navigation. The DWA can effectively avoid the moving or new obstacles in the dynamic environments.

Third, the introduction of the dynamic weighting factors makes the path planning no longer static but adjustable according to the real-time perception information and the mission status. For example, the weights can be dynamically adjusted based on the speed of the moving target, obstacle density distribution, etc., making the generated navigation path more adaptive to the current situation.

Such a strategy, which combines global and local planning and introduces dynamic weighting, significantly enhances the autonomous navigation performance of the quadruped robot in complex dynamic environments, enabling it to complete tracking tasks more efficiently and safely.

As an embodiment, when the moving target is detected as lost, the method further includes activating a particle filter-based predictive tracking mode to predict potential regions where the moving target may appear based on historical motion trajectories; and simultaneously controlling the quadruped robot to spirally expand a search path until the moving target is recaptured.

In vision-based tracking systems, the loss of the moving target is a common issue, which may be caused by various reasons, such as the target being occluded, rapid movement out of the field of view, drastic changes in lighting conditions, or camera motion blur.

It's obvious that stopping the tracking or performing random searches is inefficient. Therefore, the embodiment provides a robust recovery mechanism. When the moving target is not successfully detected or tracked in multiple consecutive frames, the moving target is determined as lost. At this point, the prediction and tracking mode based on particle filtering is immediately initiated. Particle filtering is a sequential Monte Carlo method suitable for state estimation in nonlinear, non-Gaussian systems.

In moving target tracking, the particle filtering represents the probability distribution of the moving target's possible states (such as position, velocity, and posture) through a set of randomly sampled "particles". Each particle represents a possible state of the moving target and is allocated with a weight, which reflects the consistency between the state represented by the particle and the latest observation data. When the moving target is lost, although there is no new observation data to update the weight of the particle, the historical motion trajectory information of the moving target can be used to predict the state of each particle at the next moment through a motion model. For example, if the moving target was previously moving in a straight line at a constant speed, the motion model will predict that the particles continue to move in that direction. By predicting and updating the states of all particles, the area where the moving target may appear at the current moment and its probability distribution can be obtained. This predicted area is usually a probabilistic map showing the most likely positions where the moving target may appear.

At the same time, to increase the chances of reacquiring the moving target, the quadruped robot is controlled to execute a systematic search strategy, namely the spirally expanding the search path. Starting from the last known position of the moving target or the center of the region with the highest predicted probability, the quadruped robot moves outward in a spiral pattern, gradually expanding the search area.

The spiral search is an efficient local search strategy that can systematically cover an area, avoiding redundant searches or missed areas.

While the quadruped robot is executing the spiral search, the panoramic camera continuously captures the images, and the system keeps trying to detect the lost moving target within the predicted area and/or the current field of view. During the search process, the prediction and tracking mode updates the predicted area according to the movement of the quadruped robot and continues to attempt to re-detect the moving target within the current field of view.

Once the moving target is successfully reacquired during the spiral search (i.e., it is recognized and located again in the panoramic image), the prediction and tracking mode stops, and the quadruped robot resumes the normal vision-based navigation and tracking mode.

For the control method of the embodiment, first, the prediction and tracking mode based on the particle filtering can use historical motion information to probabilistically predict the position of the moving target after it is lost, narrowing the search area and improving the efficiency of reacquiring the moving target. Compared with blind searching, the prediction can more intelligently guide the search. For example, if the moving target was last moving eastward, the prediction mode will prioritize searching in the eastern area.

Second, the spiral search path is a systematic and highly covering search strategy that ensures no area is missed within a certain range, which increases the success rate of reacquiring the moving target. Combining the spiral search with the predicted area allows for faster identification of the moving target in the most likely area. For example, in open areas, the spiral search can quickly cover a large area; in narrow areas, the spiral parameters can be adjusted to fit the terrain.

Third, such a mechanism enhances the robustness of the entire tracking system. Even after short-term occlusion or perception interruption of the moving target, the system can quickly resume tracking the moving target through prediction and search, ensuring the continuity of the mission. For example, when the moving target briefly hides behind an obstacle, the quadruped robot can perform prediction and search near the obstacle instead of completely losing track of the target. This robustness is crucial for the quadruped robot to perform tasks in complex and dynamic environments.

In the above embodiments, the prediction and tracking mode based on particle filtering can employ different motion models, such as the constant velocity model, the constant acceleration model, or learning-based motion models, to more accurately predict the movement of a moving target. The number of particles can be adjusted according to computational resources and the required prediction accuracy. Generally, the more particles there are, the higher the prediction accuracy will be, but the computational load will also increase.

The parameters of the spiral search path, such as the starting radius, spiral step size, and maximum search radius, can be set based on the speed of the moving target when it is lost, the openness of the environment, and the mission requirements. For example, for a fast-moving target, the step size can be appropriately increased; in narrow areas, the maximum search radius should be limited. In addition to spiral search, other systematic search strategies, such as arc search or fan search, can also be used. The specific choice of strategy can be optimized based on the direction of the moving target when it is lost and the environmental structure. When reacquiring the moving target, a multi-frame confirmation mechanism can be employed, meaning that the moving target is only finally confirmed to be reacquired if it is detected in multiple consecutive frames with a stable position, to avoid false detections. The thresholds for initiating the prediction and tracking mode and spiral search (e.g., the number of consecutive frames in which the moving target is not detected) can also be adjusted to balance tolerance for brief occlusions and the response speed to actual losses.

As an embodiment, the quadruped robot is also equipped with a light sensor and a light-assisted processing system. When the light sensor detects that a current ambient brightness is below a first preset value, the light-assisted processing system is activated to provide supplementary lighting. When the light sensor detects that the current ambient brightness exceeds a second preset value, the light-assisted processing system activates a light filter device to cover the surveillance camera Y.

Lighting conditions have a significant impact on the performance of vision-based systems. In low-light environments, images captured by the camera may have insufficient brightness, low contrast, and high noise levels, which can reduce the accuracy of feature extraction, detection, and recognition of the moving target. In strong light or direct sunlight conditions, images may experience overexposure, glare, or excessive shadows, which can similarly affect the image quality and information acquisition. To address these issues, the light sensor and the light-assisted processing system are introduced in the embodiment.

The light sensor (such as a photoresistor, photodiode, or ambient light sensor) is configured to monitor the ambient light intensity around the quadruped robot in real time.

The light-assisted processing system is configured to adjust the working state of the panoramic camera or provide supplementary lighting or filtration based on the measurement results from the light sensor.

Specifically, the first preset value and the second preset value are established, where the second preset value is usually much higher than the first preset value, for example, the first preset value is 100 lux, and the second preset value is 20,000 lux.

When the light sensor detects that the current ambient light brightness is below the first preset value, it indicates that the ambient light is insufficient and may affect the image quality. At this time, the light-assisted processing system activates the supplementary lighting. The supplementary lighting (such as an LED light) is configured to uniformly illuminate the field of view of the panoramic camera, especially the close-range area, to increase the overall brightness of the image, enhance contrast, reduce noise, and thereby improve image quality under low-light conditions. The brightness of the supplementary lighting can be adjusted according to the degree to which the light intensity is below the first preset value.

When the light sensor detects that the current ambient light brightness is above the second preset value, it indicates that the ambient light is too strong and may cause overexposure or glare in the image. At this time, the light-assisted processing system activates the light-filtering device. The light-filtering device (such as a switchable ND filter or polarizing filter) is controlled by a drive mechanism (such as a small motor or electromagnet) and is moved in front of camera Y to cover it. The light-filtering device can attenuate the intensity of light entering camera Y to prevent overexposure. Specific filters (such as polarizing filters) can also reduce glare and reflections, thereby improving the dynamic range and clarity of the image. Through the intelligent adjustment of the light-assisted processing system, the quadruped robot's visual perception system can obtain high-quality images under various lighting conditions, ensuring the accuracy and stability of subsequent image processing and navigation control.

The light-filtering device is set in place to not cause significant obstruction or distortion of the field of view of camera Y.

For the control method of the embodiment, first, the light-assisted processing system can activate the supplementary lighting in low-light environments, effectively increasing the image brightness, contrast, and details. This allows the visual system to clearly perceive the environment even in nighttime or indoor settings with insufficient light, thereby ensuring the operational capability of the quadruped robot. For example, in the environment with light intensity below 100 lux, the supplementary lighting can increase the average image brightness by more than double and increase the number of recognizable targets by 30%.

Second, the activation of the light-filtering device in strong light environments can prevent overexposure and glare, preserving image detail and avoiding perception failure due to strong light. For example, under direct sunlight, the light-filtering device can reduce the intensity of incoming light to $\frac{1}{16}$ of its original value, effectively preventing the overexposure and ensuring that the obstacles and the moving targets can be accurately identified.

Third, such an automatic adaptation to the lighting changes can enhance the robustness and environmental adaptability of the visual perception system, allowing the quadruped robot to reliably perform tasks under a wider range of lighting conditions without manual intervention. For example, in the environment with transitions between indoor and outdoor settings, alternating shadowed and sunny areas, the system can quickly respond to the lighting changes and always provide high-quality image input.

In another preferred embodiment of the present invention, a quadruped robot system based on visual tracking is further disclosed, which includes a panoramic camera and a controller configured on the quadruped robot. The panoramic camera includes at least three cameras arranged in a non-coplanar array, with the optical axes of the multiple cameras oriented in different directions to cover a horizontal 360-degree horizontal range. The images captured by adjacent cameras have overlapping regions at the edges of fields of view. The controller is configured to control the movement of the quadruped robot according to the quadruped robot control method described in the above embodiments.

The present invention further discloses another quadruped robot system, which includes one or more processors, memory, and one or more programs. The one or more programs are stored in the memory and are configured to be executed by the one or more processors. The program includes instructions for performing the quadruped robot control method described above. The processor can be a general-purpose central processing unit (CPU), a microprocessor, an application-specific integrated circuit (ASIC), or one or more integrated circuits, used to execute relevant programs to implement the functions required by the modules in the quadruped robot system, or to execute the quadruped robot control method.

The present invention further discloses a computer-readable storage medium, which includes a computer program that can be executed by a processor to complete the quadruped robot control method described above. The computer-readable storage medium can be any available medium that a computer can access, or can be a data storage device integrated with one or more available media, such as a server or a data center. The available medium can be read-only memory (ROM), random access memory (RAM), magnetic media (e.g., floppy disk, hard disk, magnetic tape, or magnetic disk), optical media (e.g., digital versatile disc (DVD)), or semiconductor media (e.g., solid-state disk (SSD)) etc.

The embodiments of the present application further disclose a computer program product or computer program, which includes computer instructions stored in a computer-readable storage medium. The processor of an electronic device reads the computer instructions from the computer-readable storage medium, and the execution of these instructions by the processor cause the electronic device to perform the quadruped robot control method described above.

The above disclosure is only preferred embodiments of the present invention and cannot be used to limit the scope of rights of the present invention. Therefore, any equivalent changes made in accordance with the claims of the present invention are within the scope of the present invention.

What is claimed is:

1. A vision-based tracking control method for a quadruped robot, comprising:

configuring a panoramic camera on a quadruped robot, wherein the panoramic camera comprises at least three cameras arranged in a non-coplanar array, with optical axes of the cameras oriented in different directions such that the cameras collectively cover a 360-degree horizontal range;

and images captured by adjacent cameras have overlapping regions at edges of fields of view;

receiving in real time unilateral images captured by each of the cameras at a same moment, and stitching the unilateral images based on an image stitching algorithm to synthesize a panoramic image corresponding to a current moment; generating first position coordinates of a moving target and second position coordinates of an obstacle in a current environment based on the panoramic image; formulating or modifying a navigation path for tracking the moving target based on the first position coordinates and the second position coordinates; wherein the navigation path is formulated by: establishing a path cost function incorporating dynamic weighting factors, with the weighting factors including a moving target distance coefficient, an obstacle density coefficient, and a terrain complexity; and performing global path planning by the path cost function and performing a local trajectory correction by a dynamic window approach; and controlling the quadruped robot to move along the navigation path.

2. The vision-based tracking control method for a quadruped robot according to claim 1, wherein the optical axes of the adjacent cameras form equal angles with each other.

3. The vision-based tracking control method for a quadruped robot according to claim 1, wherein the images captured by the adjacent cameras have overlapping regions of 12%-14% at the edges of fields of view.

4. The vision-based tracking control method for a quadruped robot according to claim 1, wherein said stitching the unilateral images comprises performing dynamic weighted fusion processing on the overlapping regions affected by motion blur based on a nonlinear optimization algorithm of ORB (Oriented FAST and Rotated BRIEF) feature point matching.

5. The vision-based tracking control method for a quadruped robot according to claim 1, wherein when the moving target is detected as lost, the method executes: activating a particle filter-based predictive tracking mode to predict potential regions where the moving target may appear based on historical motion trajectories; and simultaneously controlling the quadruped robot to spirally expand a search path until the moving target is recaptured.

6. The vision-based tracking control method for a quadruped robot according to claim 1, wherein the quadruped robot is further equipped with a light sensor and a light-assisted processing system, when the light sensor detects that a current ambient brightness is below a first preset value, the light-assisted processing system is activated to provide supplementary light; when the light sensor detects that the current ambient brightness exceeds a second preset value, the light-assisted processing system activates a light filter device to cover the cameras.

7. A quadruped robot system, comprising: one or more processors; a memory; and one or more programs, stored in the memory and configured to be executed by the one or more processors, the one or more programs comprising instructions for executing the method according to claim 1.

8. A computer-readable storage medium, comprising a computer program executable by a processor to implement the method of claim 1.

9. A quadruped robot system, comprising a panoramic camera and a controller configured on a quadruped robot, wherein the panoramic camera comprises at least three cameras arranged in a non-coplanar array, with optical axes of the cameras oriented in different directions such that the cameras collectively cover a 360-degree horizontal range; images captured by adjacent cameras have overlapping regions at edges of fields of view, and the controller is configured to control the quadruped robot to move according to the following method: receiving in real time unilateral images captured by each of the cameras at a same moment, and stitching the unilateral images based on an image stitching algorithm to synthesize a panoramic image corresponding to a current moment; generating first position coordinates of a moving target and second position coordinates of an obstacle in a current environment based on the panoramic image; formulating or modifying a navigation path for tracking the moving target based on the first position coordinates and the second position coordinates; establishing a path cost function incorporating dynamic weighting factors, with the weighting factors including a moving target distance coefficient, an obstacle density coefficient, and a terrain complexity; and performing global path planning by the path cost function and performing a local trajectory correction by a dynamic window approach; and controlling the quadruped robot to move along the navigation path.

* * * * *